Jan. 7, 1969  H. BECK  3,420,727
CUTTING-WELDING DEVICE FOR THERMOPLASTIC SYNTHETIC FOILS
Filed May 12, 1966

Inventor:
Hans Beck

United States Patent Office 3,420,727
Patented Jan. 7, 1969

3,420,727
CUTTING-WELDING DEVICE FOR THERMO-
PLASTIC SYNTHETIC FOILS
Hans Beck, Urbanstrasse 27, Nurtingen,
Wurttemberg, Germany
Filed May 12, 1966, Ser. No. 549,547
Claims priority, application Germany, May 15, 1965,
B 81,946
U.S. Cl. 156—498                                                        6 Claims
Int. Cl. B32b *31/18*

ABSTRACT OF THE DISCLOSURE

A cutting-welding device for thermoplastic synthetic foils with transporting means holding the marginal areas of the foil and with upper and lower guiding means for the foils to be cut and welded, in which said upper guiding means have pivotally connected thereto one end of down-holding strips for holding foil portions to be cut down on supporting means for the foil portions being cut, whereas the other end of said down-holding strips is adjustable relative to said supporting means.

---

The present invention relates to a cutting-welding device for thermoplastic synthetic foils with transporting means holding the marginal areas of the foil, and with a foil supporting member which has a good heat conductivity and which during the cutting-welding operation cooperates with a heated knife.

With devices of this type it is known for purposes of conducting away the welding heat to employ foil supporting members the interior of which is passed through by water for purposes of cooling said members. Such a cooling operation is necessary in order to prevent the foil from becoming plastic at undesired portions and for assuring that the cutting-welding seam will solidify sufficiently fast. With these devices, the foils are in the vicinity of the knife pressed against the foil supporting members by means of holding-down strips or rails.

These heretofore known structures have the drawback that a water cooling system must be provided and that the foils when passing through between the supporting members and the holding-down strips or rails have the tendency to crease so that serpentine-shaped or creased welding seams may be formed.

It is, therefore, an object of the present invention to provide a cutting-welding device which will overcome the above mentioned drawbacks.

It is another object of this invention to provide a cutting-welding device which will greatly simplify the cooling system and at the same time will always assure smooth welding seams.

These and other objects and advantages of the invention will appear more clearly from the following specification in connection with the accompanying drawing, in which.

Figure 1:
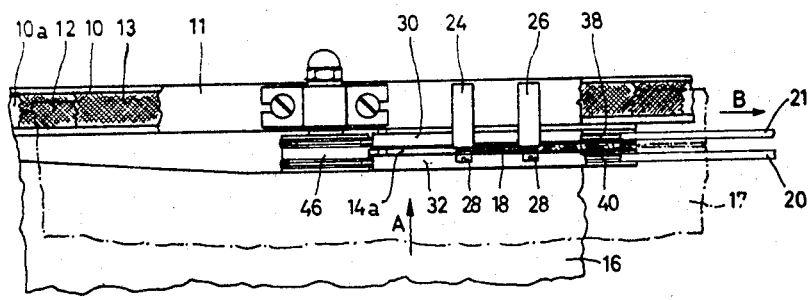
FIG. 1 is a top view of a portion of a cutting-welding device according to the present invention.
Figure 2:
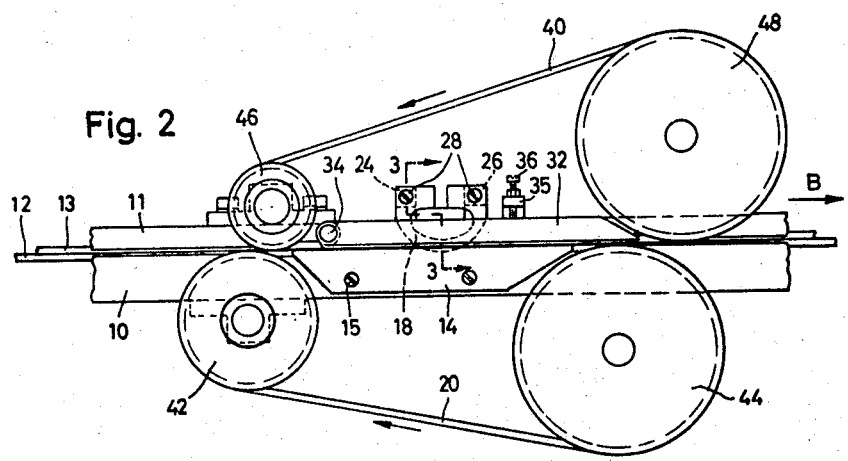
FIG. 2 is a side view of the welding device of FIG. 1 as seen in the direction of the arrow A in FIG. 1.
Figure 3:
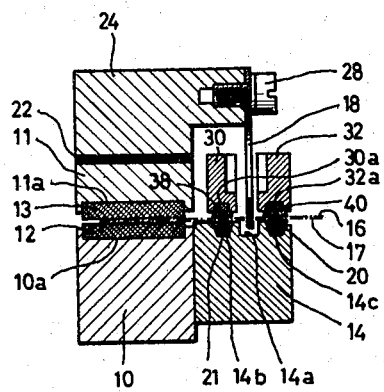
FIG. 3 represents a section taken along the line III—III of FIG. 2.

The objects underlying the present invention have been realized by designing the foil supporting member as guiding means for at least one endless conveyor belt which is guided in the supporting member in the immediate vicinity of the knife, and by designing the said endless conveyor belt likewise as foil supporting means which outside the guiding means is passed over driving and deviating members and through media the temperature of which is less than the temperature which the endless transporting means has assumed when passing the welding station.

In this way, within the range of the knife a proper guiding system and a crease-free transport is obtained, and in addition thereto, by means of the endless transporting means, heat is withdrawn from the vicinity of the heated knife and conveyed to a colder area.

In particular, a forced cooling of the foil supporting means is no longer required because the foil supporting means is in conformity with the present invention continuously transferring heat to said endless conveyor belt or transporting means by means of which heat is withdrawn from the heat source and during the circulation of the endless transporting means outside the guiding means and conveyed to other parts and to the surrounding air.

It is of particular advantage in conformity with the present invention to provide the holding-down strips or bars with guiding means for a second endless conveyor belt or transporting means which is located opposite to the first endless transporting means and which conveys in the same direction. In this way a particularly crease-free transport of the foils and a still more effective cooling is obtained.

These effects can be further increased by arranging at both sides of the knife and in closely spaced relationship thereto one pair each of guided endless transporting means. Advantageously, the depth of the guiding means is selected somewhat less than the height of the endless transporting means guided therein. Thus, since the guiding means almost completely receive the endless transporting means, the guiding means protect the said endless transporting means against direct radiation heat from the heated water, which is particularly desired when the endless transporting means are formed by elastic belts.

Expediently, the deviating rollers or return rollers of the endless transporting means consist of metal. In such an instance also the deviating rollers can serve the purpose of absorbing heat from the endless transporting means, and the heat is then withdrawn from the endless transporting means by the rotation of the latter in the surrounding air and through the bearing shafts.

Referring now to the drawing in detail, it will be seen that along one side of a machine bed not shown, there is firmly connected to the machine bed a lower and upper guiding means 10 and 11 respectively. These guiding means are at those surfaces thereof which face each other provided with guiding grooves 10a, 11a in which endless driven belts 12 and 13 move. These belts 12 and 13 are by their guiding means 10 and 11 pressed against each other and while holding therebetween the marginal portions of foil webs 16 and 17, transport the same in the direction of the arrow B. Connected to the lower guiding means 10 by means of screw connecting members is a metallic solid foil supporting member 14 provided at its top side with a groove 14a into which partially extends that member which carries out the cutting-welding operation. Parallel to each side of the groove 14a, first guiding grooves 14b and 14c are provided in the foil supporting member 14, which guiding grooves have a trapezoidal cross section and receive circulating belts 20 and 21 of likewise trapezoidal cross section (V-belts). These circulating belts 20 and 21 transport the foils 16 and 17 likewise at the same velocities as the belts 12 and 13 in the direction of the arrow B.

Arranged at the upper guiding means 11 are, in a manner not shown, two current feeding holders 24 and 26 which are electrically insulated by a layer 22. To these two current feeding holders 24 and 26 is connected one end each of a leg of knife 18 having a U-shaped contour. This connection is effected by screws 28 electrically and mechanically. The holders 24 and 26 are connected to an energy source which is intended for heating the knife.

One end of two holding-down strips or rails 30 and 32 is by means of a bolt 34 tiltably journalled on the upper guiding means 11.

The distance of the other end portion of said two strips or rails 30 and 32 may be finely adjusted by adjusting screws 36 relative to the foil supporting member 14. The adjusting screws 36 are adjustable in a support 35 mounted on the guiding means 11. Both holding-down strips or rails 30 and 32 have those sides which are opposite to the first guiding grooves 14b and 14c provided with two guiding grooves 30a and 32a which are likewise adapted to receive circulating V-belts 38 and 40. The lower belts 20 and 21 are driven through the intervention of metallic pulleys 42 and 44 and are deviated thereby, said pulleys being rotatably journalled on the lower guiding means 10. Correspondingly, belts 38 and 40 are passed over and deviated by metallic pulleys 46 and 48 which are rotatably journalled on the upper guiding means 11.

When employing the above described cutting-welding device, all endless bands and belts 12, 13, 20, 21, 38 and 40 rotate at the same linear velocity so that the foils 16 and 17 will smoothly and without creases be conveyed against the heated knife 18 and past the latter. The welding seam formed while the foils pass by will thus on one hand separate the foil portions at both sides of the seam and on the other hand will by means of a welding process unite those portions of the oppositely located foils 16 and 17 which are located within the seam area. The heat occurring within this range has to be withdrawn as quickly as possible in order to assure a proper solidification of the welding seam. The heat is absorbed by parts 40, 30 and 32 and the major portion is again withdrawn thereby and conveyed to the circulating belts 20, 21, 38 and 40. These belts cool outside the guiding means 14b, 14c, 30a and 32a on the above mentioned pulleys 43, 44, 46 and 48 and are furthermore cooled by the surrounding air so that the belts in addition to acting as transporting means also are effective in bringing about a considerable cooling.

It is, of course, to be understood that the present invention is, by no means, limited to the particular arrangement shown in the drawing but also comprises any modifications within the scope of the appended claims. Thus, the arrangement according to the invention may also be employed at both sides of a foil transporting device in order to close weld filled or non-filled bags along the marginal areas thereof.

Furthermore, the device according to the invention may be equipped either with a stationary or an oscillating knife.

What I claim is:

1. A separating-welding device for thermoplastic synthetic foils, which includes: cutting means adapted to be heated for cutting and fusing together superimposed foil portions fed into said cutting means, conveying means operable to convey and feed marginal portions of superimposed foils into and past said cutting means, supporting means of high heat conductivity arranged adjacent said cutting means for supporting the foil portions being cut by said cutting means during the cutting operation thereof, down-holding means arranged opposite said supporting means adjacent said cutting means and operable to hold foil portions to be cut by said cutting means down on said supporting means, one end of said down-holding means being pivotally supported at a fixed distance with regard to said supporting means, means operatively connected to the other end of said supporting means for selectively adjusting said other end with regard to said supporting means, said conveying means including endless belt means on said supporting means adjacent to said cutting means for likewise supporting foil portions during the cutting operation of said cutting means, and pulley means arranged outside the cutting and heating area of said cutting means for supporting and driving said endless belt means and conducting way from said endless belt means heat conveyed by said cutting means and said supporting means to said endless belt means.

2. A device according to claim 1, which includes additional conveying means in the form of endless conveying means arranged on said down-holding means for conveying foil portions into and past said cutting means and being located substantially in alignment with said endless belt means and being movable in the same direction and at the same speed as the latter.

3. A device according to claim 2, in which each of said endless belt means and said additional conveying means includes two endless belts respectively arranged on opposite sides of and in close relationship to said cutting means.

4. A device according to claim 2, in which said endless belt means includes two endless belts arranged on opposite sides and in close relationship to said cutting means.

5. A device according to claim 2, in which said supporting means is provided with groove means guiding therein said endless belt means, the depth of said groove means being less than the height of said endless belt means.

6. A device according to claim 5, in which said groove means and said endless belt means are of trapezoidal cross section.

References Cited

UNITED STATES PATENTS

| | | | |
|---|---|---|---|
| 2,680,470 | 6/1954 | Stanton | 156—498 |
| 3,142,608 | 7/1964 | Techtmann et al. | 156—515 |

DOUGLAS J. DRUMMOND, *Primary Examiner.*

U.S. Cl. X.R.

156—515